US008700057B2

(12) United States Patent
Jovicic et al.

(10) Patent No.: US 8,700,057 B2
(45) Date of Patent: Apr. 15, 2014

(54) METHOD AND APPARATUS FOR MULTI-RESOLUTION ADAPTIVE POSITIONING

(75) Inventors: Aleksandar Jovicic, Jersey City, NJ (US); Cyril Measson, Somerville, NJ (US); Thomas J. Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/350,413

(22) Filed: Jan. 13, 2012

(65) Prior Publication Data

US 2013/0183999 A1 Jul. 18, 2013

(51) Int. Cl.
*H04W 24/00* (2009.01)

(52) U.S. Cl.
USPC ....................................................... 455/456.1

(58) Field of Classification Search
USPC ............. 455/456.3, 456.5, 456.1, 435.1, 517, 455/456.2, 418, 414.1; 370/338, 329, 328, 370/254; 340/10.1, 572.1; 342/357.43, 342/357.29, 127
See application file for complete search history.

(56) References Cited

U.S. PATENT DOCUMENTS

| 7,406,116 | B2 | 7/2008 | Agrawala et al. | |
|---|---|---|---|---|
| 8,000,719 | B1 | 8/2011 | Lambert | |
| 2009/0310585 | A1 | 12/2009 | Alizadeh-Shabdiz | |
| 2009/0325598 | A1* | 12/2009 | Guigne et al. | 455/456.1 |
| 2010/0246485 | A1* | 9/2010 | Potkonjak | 370/328 |
| 2010/0309051 | A1 | 12/2010 | Moshfeghi | |
| 2011/0065457 | A1 | 3/2011 | Moeglein et al. | |
| 2011/0230210 | A1* | 9/2011 | Drennan | 455/456.3 |
| 2011/0254978 | A1 | 10/2011 | Yamaji | |
| 2011/0274094 | A1 | 11/2011 | Jovicic et al. | |
| 2011/0279323 | A1* | 11/2011 | Hung et al. | 342/451 |
| 2012/0327922 | A1 | 12/2012 | Takahashi et al. | |

FOREIGN PATENT DOCUMENTS

WO 2009149417 A1 12/2009
WO 2011148741 A1 12/2011

OTHER PUBLICATIONS

Chiou, et al., "An adaptive location estimator using tracking algorithms for indoor WLANs," Wireless NETw, vol. 16, No. 7, 2010, pp. 1987-2012.
Jan, et al., "Improving the accuracy of cell-based positioning for wireless networks," Computer Networks, vol. 46, Issue 6, Dec. 20, 2004, pp. 817-827, http://www.sciencedirect.com/science/article/pii/S1389128604001756.
International Search Report and Written Opinion—PCT/US2013/021282—ISA/EPO—Apr. 29, 2013.

* cited by examiner

*Primary Examiner* — Kiet Doan
(74) *Attorney, Agent, or Firm* — James K. O'Hare (57) ABSTRACT

Various embodiments are directed to methods and apparatus for mobile device position determination and the efficient communication of mobile device position related information. In different areas different types of reference signals may be available to be used by a mobile device for position determination. Some types of references signal may be well suited for an indoor environment, e.g., audio signals, Bluetooth signals and Wi-Fi signals, while other types of signals may be well suited for an outdoor environment, e.g., GPS signals and cellular base station signals. Different types of signals may facilitate different possible resolution accuracies for a position determination. In various embodiments, in different areas within a geographic coverage region, different sets of reference signals are available to determine its position. In some embodiments, different position determination resolutions are used in different area as a function of the reference signal type which is available.

24 Claims, 6 Drawing Sheets

METHOD AND APPARATUS FOR MULTI-RESOLUTION ADAPTIVE POSITIONING

FIELD

Various embodiments relate to mobile device position determination, and more particularly to, methods and apparatus for mobile device position determination in an area in which different types of reference signals may be available.

BACKGROUND

In some communications systems mobile wireless devices may move throughout a large overall coverage area including both indoor and outdoor environments. It is desirable for a mobile wireless device to be able to determine its location and communicate its location to other devices in an efficient manner, irrespective of where it is currently located. The resolution to which a mobile wireless device may be able to determine its position may vary throughout the system. In one simple implementation approach, the large overall coverage area is subdivided into a gridmap of uniform size elements, a mobile wireless device determines a probability corresponding to each of the uniform size elements into the entire overall coverage area, and determines its position as the element in the gridmap having the highest determined probability. In this approach a large number of computations are needed, e.g., a probability determination for each individual element in the grid. In addition, the chosen single resolution for the gridmap leads to inefficiencies. For example, in some regions higher position resolution determination might have been possible than the selected single resolution of the gridmap, while in other regions the selected single resolution of the gridmap may exceed the achievable actual position determination capability at that particular location.

Based on the above discussion there is a need for new methods and apparatus for mobile device position determination and/or communication of position related information. It would be advantageous if at least some new method and apparatus provided for a more flexible approach to mobile device position determination which matched environment capabilities to position determination resolution and/or made for more efficient use of communications resources to communicate position information.

SUMMARY

Various embodiments are directed to methods and apparatus for mobile device position determination and the efficient communication of mobile device position related information. In different areas different types of reference signals may be available to be used by a mobile device for position determination. Some types of references signal may be well suited for short range in an indoor environment, e.g., audio signals, Bluetooth signals and Wi-Fi signals, while other types of signals may be well suited for an outdoor environment, e.g., GPS signals and cellular base station signals. Different types of signals may facilitate different possible resolution accuracies for a position determination. In various embodiments, in different areas within a geographic coverage region, different sets of reference signals are available to be used by a mobile wireless device to determine its position. In some embodiments, different position determination resolutions are used in different areas as a function of the reference signal type which is available.

In some embodiments, a wireless device determines whether or not it is located within a particular area as a function of the type of signals that it receives. In some embodiments, a mobile wireless device communicates its determined position using one of a plurality of different predetermined resolutions as a function of the area that it is located in, e.g., a higher resolution is used for indoors than outdoors. In some embodiments, a map with different areas corresponding to different resolutions and different sets of available reference signals upon which position determination is based is pre-stored in the mobile wireless devices. In some other embodiments, a map with different areas corresponding to different resolutions and different sets of available reference signals upon which position determination is based is dynamically generated based on signal detection and position determination measurements performed by a plurality of mobile devices working in cooperation with one another.

An exemplary method of controlling a wireless device that provides positioning related information in accordance with some embodiments comprises: receiving a first signal used for making a position determination, said first signal being of a first signal type; and determining, based on said first signal type, a first resolution to be used for a first area in which the wireless device may be located. The exemplary method further comprises performing a first location determination operation based on the first determined resolution. An exemplary wireless device, in accordance with some embodiments, comprises at least one processor configured to: receive a first signal used for making a position determination, said first signal being of a first signal type; determine, based on said first signal type, a first resolution to be used for a first area in which the wireless device may be located; and perform a first location determination operation based on the first determined resolution. The exemplary wireless device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
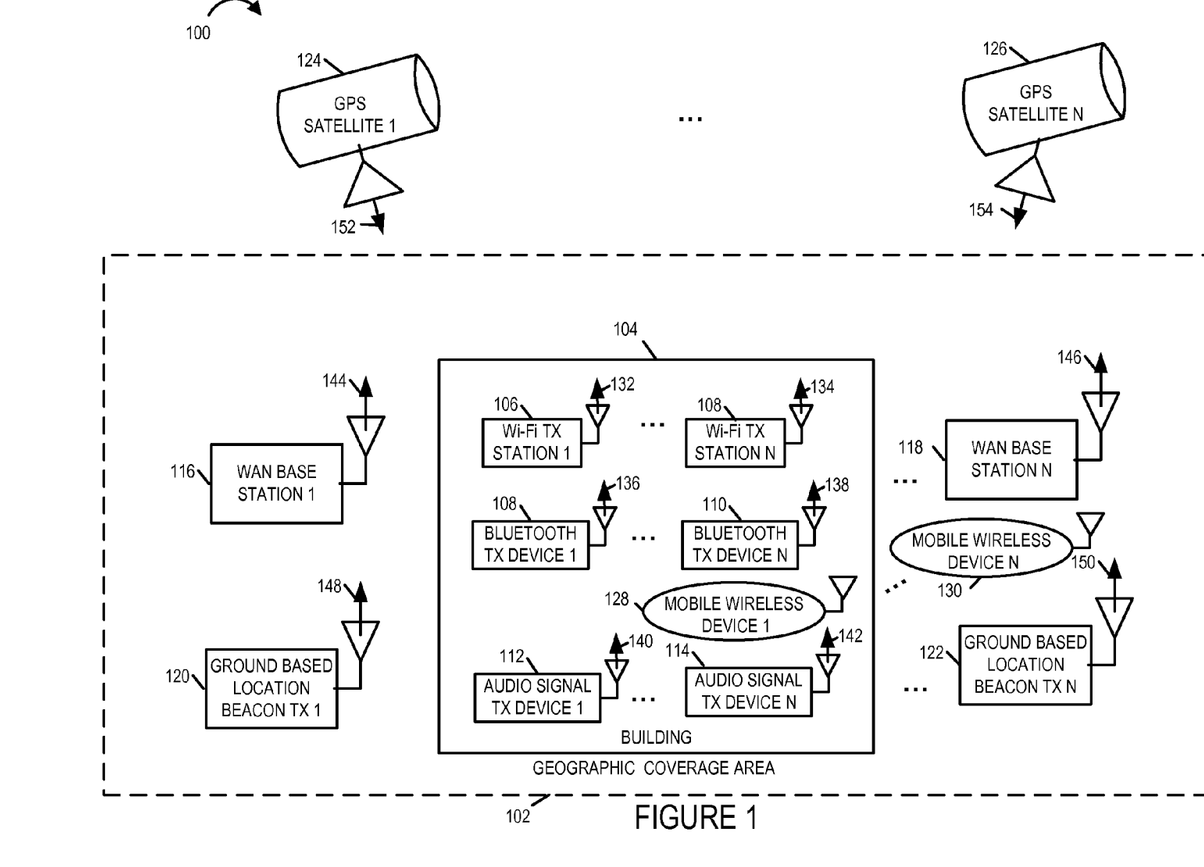
FIG. 1 is a drawing of an exemplary system in which a mobile wireless device may determine and communicate positioning related information in accordance with various exemplary embodiments.

FIG. 1 is a drawing of an exemplary system 100, in which mobile wireless devices determine position and communicate position related information, in accordance with an exemplary embodiment. Exemplary system 100 includes a plurality of mobile wireless devices (mobile wireless device 1 128, ..., mobile wireless device N 130), which may move through the geographic area 102 and determine their position and communicate their determined position and/or position related information to other mobile wireless devices, e.g., other mobiles devices in their local vicinity.

Exemplary system 100 includes a geographic coverage area 102 in which mobile wireless devices may determine their position. Geographic coverage area 102 includes both an indoor area and an outdoor area. Within geographic coverage area 102 there is a building 104, and within building 104 there are a plurality of transmitters at fixed predetermined known locations which transmit signals used for position determination purposes within building 104. Within building 104 there are a plurality of Wi-Fi TX stations (Wi-Fi TX station 1 106, ..., Wi-Fi TX station N 108) which transmits signals (132, ..., 134), respectively, a plurality of Bluetooth TX devices (Bluetooth TX device 1 108, ..., Bluetooth TX device N 110), which transmit signals (136, ..., 138), respectively, and a plurality of audio signal TX devices (audio signal TX device 1 112, ..., audio signal TX device N 114), which transmit signals (140, ..., 142), respectively. Outside building 104 but within coverage area 102, there are a plurality of terrestrial based transmitter devices which transmit signals used for determining mobile device position in the outdoors. These terrestrial based outdoor transmitters include a plurality of WAN base stations (WAN base station 1 116, ..., WAN base station N 118) which transmit signals (144, ..., 146), respectively, and a plurality of ground based location beacon transmitters (ground based location beacon TX 1 120, ..., ground based location beacon TX N 122), which transmit signals (148, ..., 150), respectively. In addition to the ground based transmitters used for mobile device position determination, there are a plurality of GPS satellites (GSP satellite 1 124, ..., GPS satellite N 126), which transmit GPS signals (152, ..., 154), respectively, which are used by the mobile devices (128, ..., 130) for determining position in an outdoor environment.

In different areas of the geographic coverage area, a mobile wireless device determines its position based on different sets of received signals. In different areas of geographic coverage region 102 a mobile wireless device determines its position determination to a different resolution, e.g., different areas use different grid sizes.

Figure 2:
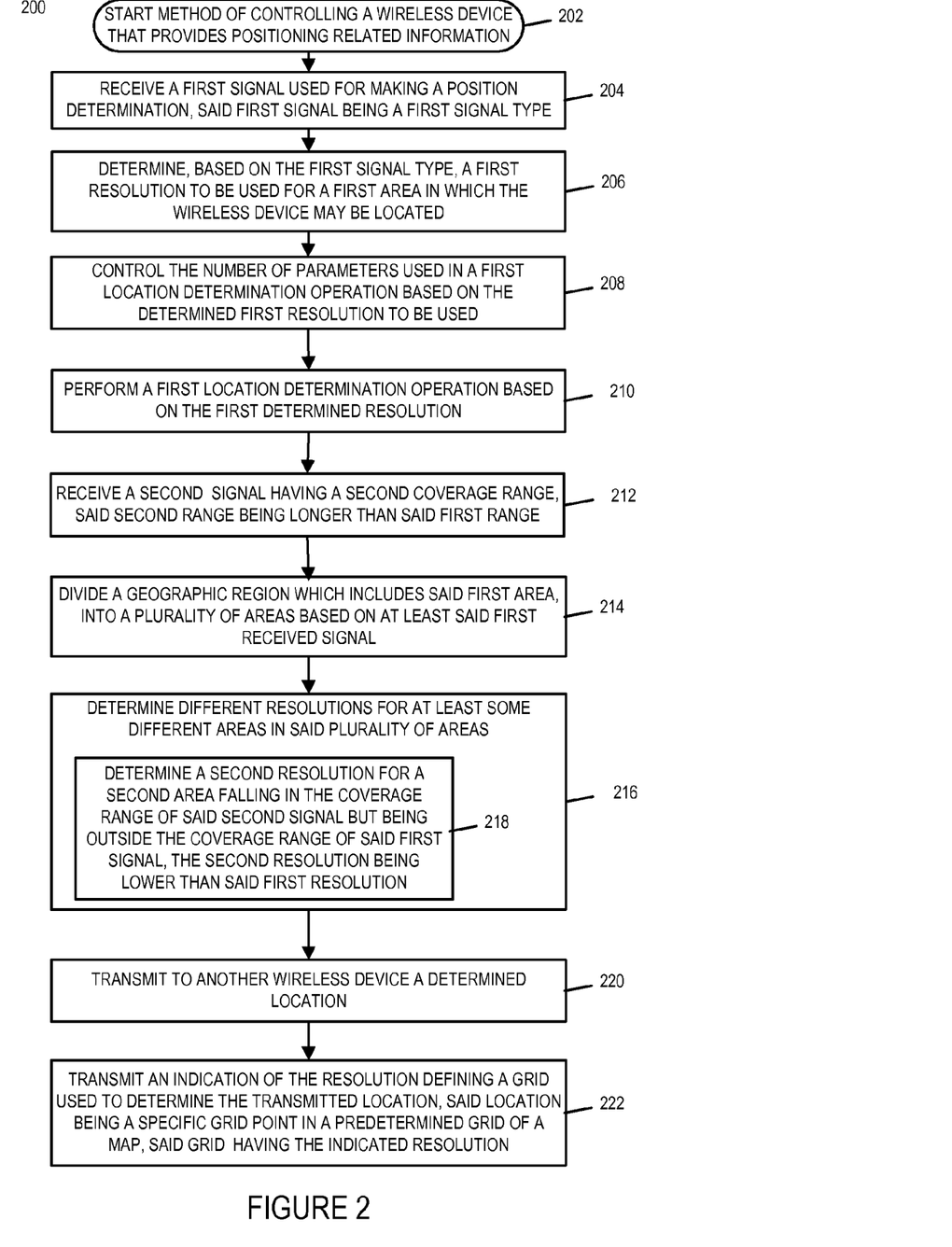
FIG. 2 is a flowchart of an exemplary method of operating a wireless communications device in accordance with various embodiments.

FIG. 2 is a flowchart 200 of an exemplary method of operating a wireless device that provides positioning related information in accordance with an exemplary embodiment. The wireless device is, e.g., a wireless terminal making position determinations and communicating position related information to other wireless devices. The wireless device implementing the method of flowchart 200 is, e.g., one of the mobile wireless devices (128, ..., 130) of system 100 of FIG. 1. Operation of the exemplary method starts in step 202, where the wireless device is powered on and initialized. Operation proceeds from start step 202 to step 204. In step 204 the wireless device receives a first signal used for making a position determination, said first signal being a first signal type. In some embodiments, the first signal is a signal having a first coverage range, and the first coverage range corresponds to the first area. Operation proceeds from step 204 to step 206. In step 206, the wireless device determines, based on the first signal type, a first resolution to be used for a first area in which the wireless device may be located. Operation proceeds from step 206 to step 208.

In step 208 the wireless device controls the number of parameters used in a first location determination operation based on the determined first resolution to be used. For example, the number of parameters is the vertices of a grid used for location determination in the first area. Operation proceeds from step 208 to step 210.

In step 210 the wireless device performs a first location determination operation based on the first determined resolution. Operation proceeds from step 210 to step 212. In step 212 the wireless device receives a second signal having a second coverage range, said second range being longer than a first coverage range. Operation proceeds from step 212 to step 214. In step 214 the wireless device divides a geographic region which includes said first area into a plurality of areas based on at least said first received signal. Operation proceeds from step 214 to step 216.

In step 216 the first device determines different resolutions for at least some different areas in said plurality of areas. Step 216 includes step 218, in which the first device determines a second resolution for a second area falling into the coverage range of the said second signal but being outside the coverage range of said first signal, the second resolution being lower than the first resolution. In some embodiments, the second signal is one of a GPS signal or a cellular base station signal, and the first signal is one of a Wi-Fi, Bluetooth, or audio signal. Operation proceeds from step 216 to step 220.

In step 220 the wireless device transmits to another wireless device, e.g., another mobile, a determined location and in step 222 the wireless device transmits an indication of the resolution defining a grid used to determine the transmitted location, said location being a specific grid point in a predetermined grid, said grid having the indicated resolution. In some embodiment the grid is a rectangular grid. In some embodiments, the communicated determined location is information indicating that the wireless device is in the first area. In some embodiments, the communicated determined location is information indicating that the wireless device is in the first area and information indicating which particular gridblock within the first area the wireless device is estimated to be located at. In some embodiments, the decision whether or not to communicate wireless terminal position determination information corresponding to the first area is a function of a determined probability estimation that the wireless device is located in the first area, e.g., transmission occurs for the probability estimate exceeding a first threshold. In some embodiments, the determination as to which position information to communicate, e.g., position indicating that the wireless device is in the first area or information indicating that the wireless device is in the first area and which gridblock in the first area, is a function of the probability of the position estimation within the first area.

In some embodiments, areas to which different resolutions correspond are non-overlapping with one another. In some embodiments, the determining of the first resolution in step 206 is further performed as a function of the type of physical space in which the wireless device is located in addition to the type of signal. For example, in some embodiments, indoor and outdoor spaces may correspond to different resolutions. In some embodiments, there are different resolutions for different types of indoor spaces, e.g., a mall space vs an office building space. In some embodiments, there are different resolutions for different types of outdoor spaces, e.g., a rural space vs an urban space. In various embodiments, a resolution determined based on a terrestrial signal is higher than a resolution determined based on a satellite signal. In some embodiments, a resolution determined based on a signal from an indoor signal source is higher than a resolution determined based on an outdoor signal source.

Figure 3:
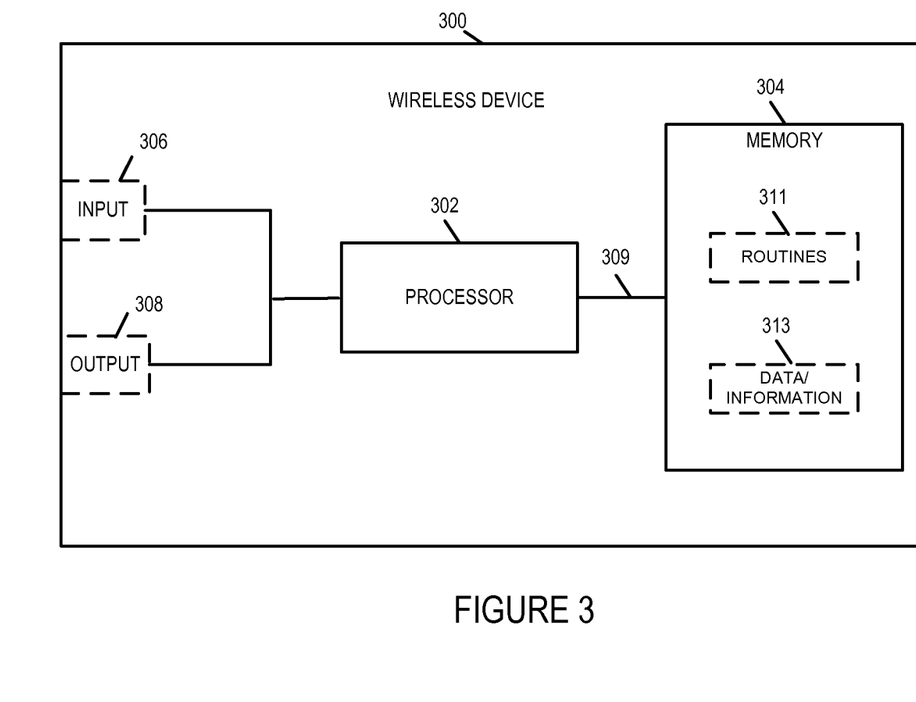
FIG. 3 is a drawing of an exemplary wireless communications device in accordance with an exemplary embodiment.

FIG. 3 is a drawing of an exemplary wireless device 300 in accordance with an exemplary embodiment. Exemplary wireless device 300 is, e.g., one of the wireless communications devices of system 100 of FIG. 1, e.g., one of mobile wireless device 1 128, . . . , mobile wireless device N 130. Exemplary wireless device 300 may, and sometimes does, implement a method in accordance with flowchart 200 of FIG. 2.

Wireless device 300 includes a processor 302 and memory 304 coupled together via a bus 309 over which the various elements (302, 304) may interchange data and information. Wireless communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver, an audio signal receiver, a GPS receiver, and/or a wired or optical input interface for receiving input. In some embodiments, the input module 306 includes a plurality of receivers or receiver modules for receiving different types of signals, e.g., a GPS receiver, a ground based location beacon receiver, a CDMA WAN receiver, an OFDM WAN receiver, a Wi-Fi receiver, a Bluetooth receiver, and an audio signal receiver. In various embodiments, at least some of the receivers can, and sometimes do, receive signals concurrently. Output module 308 may include, and in some embodiments does include, a wireless transmitter and/or a wired or optical output interface for transmitting output. In some embodiments, memory 304 includes routines 311 and data/information 313.

In some embodiments, processor 302 is configured to: receive a first signal used for making a position determination, said first signal being of a first signal type; determine, based on said first signal type, a first resolution to be used for a first area in which the wireless device may be located; and perform a first location determination operation based on the first determined resolution. In various embodiments, processor 302 is further configured to: control the number of parameters, e.g., the vertices of grid used for location determination in said first area, used in a first location determination operation based on the determined first resolution to be used.

In some embodiments processor 302 is configured to: divide a geographic region which includes said first area, into a plurality of areas based on at least said first received signal; and determine different resolutions for at least some different areas in said plurality of areas.

In some embodiments, the first signal is a signal having a first coverage range, said first range corresponding to said first area; and processor is 302 further configured to: receive a second signal having a second coverage range, said second range being longer than said first range; and determine a second resolution for a second area falling in the coverage range of said second signal but being outside the coverage range of said first signal, the second resolution being lower than said first resolution. In one such embodiment, the second signal is one of a GPS or cellular base station signal; and the first signal is one of a Wi-Fi, Bluetooth or audio signal.

In some embodiments, processor 302 is configured to: transmit to another wireless device, e.g., a mobile, a determined location, e.g., a location in the first area in which device determines it is located. In some such embodiments, processor 302 is further configured to: transmit an indication of the resolution defining a grid used to determine the transmitted location, said location being a specific grid point in a predetermined grid of a map, said grid having the indicated resolution. In some embodiments, the areas to which different resolutions correspond are non-overlapping with regard to each other. In some embodiments the grid is a rectangular grid, e.g., each unit in the grid corresponding to the first region has a rectangular shape. In some such embodiments, each unit within a grid corresponding to a region has an identical area.

Processor 302, in some embodiments, is configured to determine the first resolution as a function of the type of physical space in which the wireless device is located in addition to the type of signal. There may be a difference between indoors and outdoors, e.g., indoor resolutions are higher than outdoor resolutions. As another example, there may be different types of indoor physical spaces corresponding to different resolutions, e.g., an indoor mall space vs an indoor office building space. As still another example, there may be different types of outdoor spaces corresponding to different resolutions, e.g., an outdoor rural space vs outdoor urban space.

In some embodiments, processor 302 is configured such that a resolution determined based on a terrestrial signal is higher than a resolution determined based on a satellite signal. In some embodiments, processor 302 is configured such that a resolution determined based on a signal from an indoor signal source is higher than a resolution determined based on an outdoor signal source.

Figure 4:
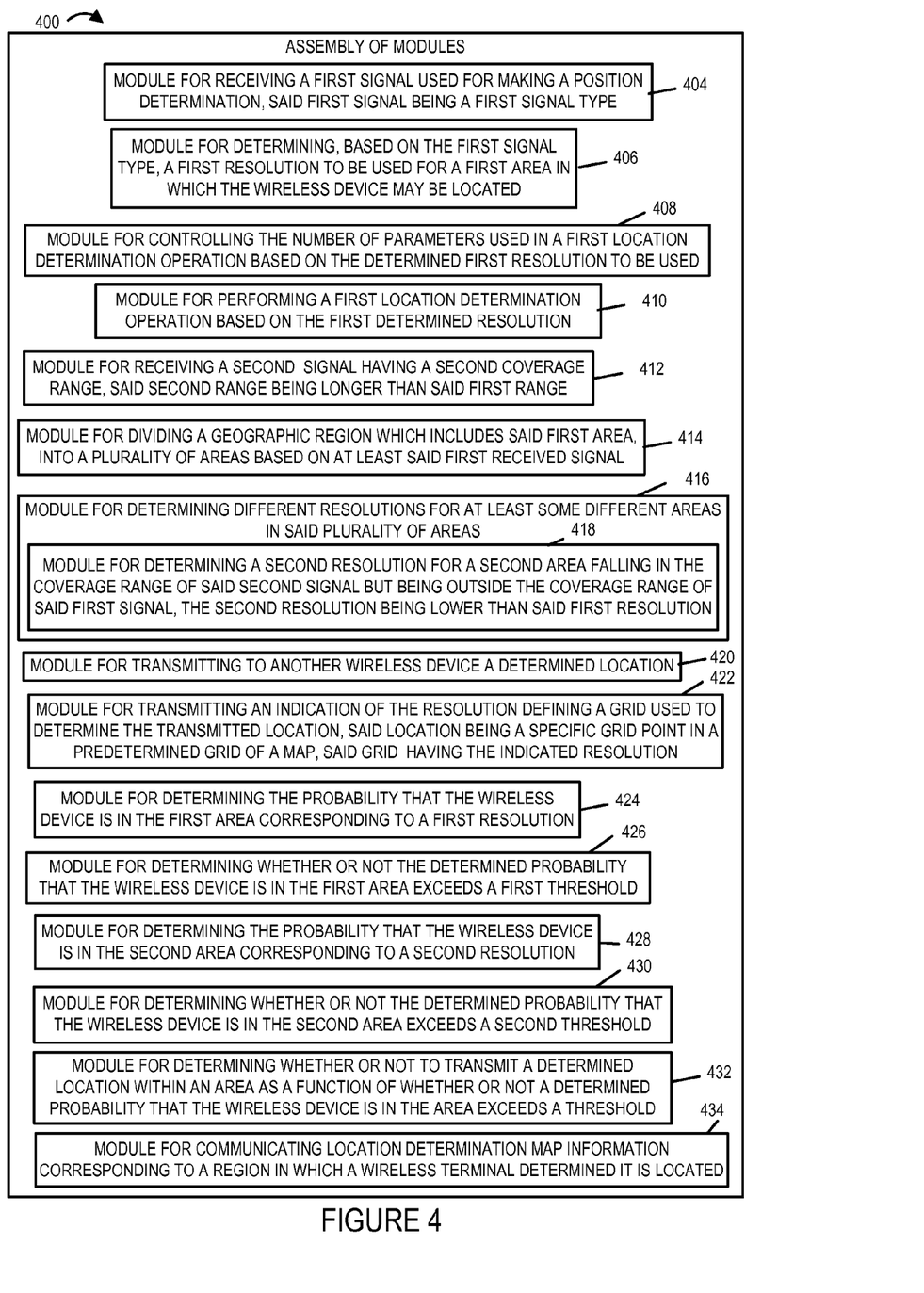
FIG. 4 is an assembly of modules which can, and in some embodiments is, used in the exemplary wireless communications device illustrated in FIG. 3.

FIG. 4 is an assembly of modules 400 which can, and in some embodiments is, used in the exemplary wireless device 300 illustrated in FIG. 3. The modules in the assembly 400 can be implemented in hardware within the processor 302 of FIG. 3, e.g., as individual circuits. Alternatively, the modules may be implemented in software and stored in the memory 304 of wireless communications device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless communications device 300 or elements therein such as the processor 302, to perform the functions of the corresponding steps illustrated and/or described in the method of flowchart 200 of FIG. 2.

Assembly of modules 400 includes a module for receiving a first signal used for making a position determination, said first signal being a first signal type 404, a module for determining, based on the first signal type, a first resolution to be used for a first area in which the wireless device may be located 406, a module for controlling the number of parameters used in a first location determination operation based on the first resolution to be used 408, and a module for performing a first location determination operation based on the first determined resolution 410. In some embodiments, module 406 determines the first resolution as a function of the type of physical space in which the wireless device is located in addition to the type of signal. Assembly of modules 400 further includes a module for receiving a second signal having a second coverage range, said second range being longer than a first range 412, a module for dividing a geographic region which includes said first area into a plurality of areas based on at least the first received signal 414, and a module for determining different resolutions for at least some different areas in said plurality of areas 416. Module 416 includes a module for determining a second resolution for a second area falling in the coverage range of said second signal but being outside the coverage range of said first signal, the second resolution being lower than said first resolution 418. In some embodiments, the second signal is one of a GPS and cellular base station signal and the first signal is one of a Wi-Fi and Bluetooth and audio signal. In some embodiments, the areas to which different resolution correspond are non-overlapping with regard to each other.

In various embodiments, a resolution determined based on a terrestrial signal is higher than a resolution determined based on a satellite signal. In some embodiments, a resolution determined based on a signal from an indoor signal source is higher than a resolution determined based on an outdoor signal source.

Assembly of modules 400 further includes a module for transmitting to another wireless device a determined location 420 and a module for transmitting an indication of the resolution defining a grid used to determine the transmitted location, said location being a specific grid point in a predetermined grid of a map, said grid having the indicated resolution 422. In some embodiments, the grid is a rectangular grid. In various embodiments, a grid element or gridblock is rectangular.

Assembly of modules 400 further includes a module for determining the probability that the wireless device is in the first area corresponding to a first resolution 424, and a module for determining whether or not the determined probability that the wireless device is in the first area exceeds a first threshold 426. Assembly of modules 400 further includes a module for determining the probability that the wireless device is in the second area corresponding to a second resolution 428, a module for determining whether or not the determined probability that the wireless device is in the second area exceeds a second threshold 430, and a module for determining whether or not to transmit a determined location within an area as a function of whether or not a determined probability that the wireless device is in an area exceeds a threshold 432. In some embodiments, module 424 makes its determination as a function of the type of signals received, previous determined position determinations, estimations of mobile device speed, and estimations of mobile direction, and received position information communicated from other mobile devices.

Assembly of modules 400 also includes a module for communicating location determination map information corresponding to a region in which a wireless device determined that is located 434. For example, in some embodiments, mobile wireless devices work in cooperation to generate and/or update a location determination map which identifies different regions, corresponding to different types of signals which are available to be used for position determination, e.g., with different grid resolutions corresponding to the different types of received signals. In some embodiments, when a wireless device determines with a probability above a predetermined threshold that it is in a particular region using a particular set of signals for position determination and having a particular corresponding resolution, module 434 generates and transmits a signal communicating the positioning related information to one or more other mobile wireless devices. Module 434 also recovers similar information generated from other peer mobile wireless devices and updates its stored location map using the received positioning related information.

Figure 5:
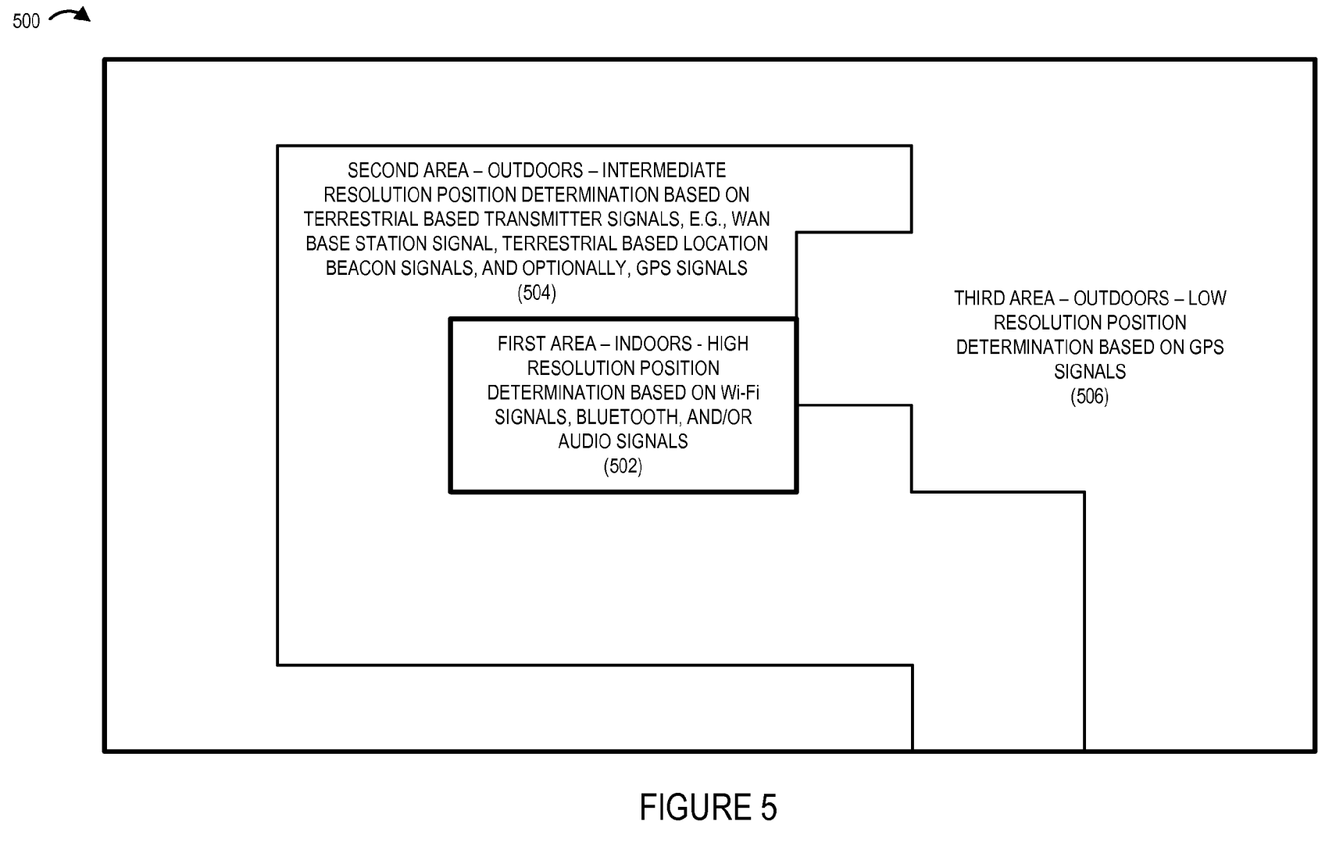
FIG. 5 is a drawing illustrating an exemplary geographic region which includes a plurality of areas with different location determination resolutions corresponding to the different areas.

FIG. 5 is a drawing illustrating an exemplary geographic coverage region 500 which includes a plurality of non-overlapping areas with different location determination resolutions corresponding to the different areas. Exemplary geographic region 500 includes an exemplary first area 502, an exemplary second area 504 and an exemplary third area 506. Exemplary first area 502 is an indoors area, e.g., indoors building 104 of FIG. 1. First area 502 is a high resolution position determination area in which position determination is based on received Wi-Fi signals, e.g., received signals (132, . . . , 134) of FIG. 1, received Bluetooth signals, e.g., received Bluetooth signals (136, . . . , 138) of FIG. 1, and/or received audio signals, e.g., received audio signals (140, . . . , 142) of FIG. 1. Second area 504 is an outdoors area which is an intermediate resolution position determination area. In second area 504 at least some terrestrial based ground signals can be expected to be received and the mobile device position determination is based on received terrestrial ground based signals and, in some embodiments optionally on received GPS signals in addition to the terrestrial based signals. Exemplary received terrestrial ground based signals which may be, and sometimes are received in region 504 include, e.g., received WAN base station signals (144, . . . , 146) of FIG. 1 and received ground based location beacon signals (148, . . . , 150) of FIG. 1. Third area 506 is an outdoors area which is a low resolution position determination area in which the mobile device position determination is based on received GPS signals, e.g., received GPS signals (152, . . . , 154) of FIG. 1.

In some embodiments, there are different resolution indoor areas, e.g., as a function of the type of indoor environment, e.g., an office vs a mall. In some embodiments, there are different resolution outdoor areas as a function of the type of area, e.g., rural vs city. In some embodiments, a particular area having a particular position determination resolution may, and sometimes does, include a plurality of non-contiguous sub-areas.

In some embodiments, there may be known dead areas in which no received signals are expected to be available for position determination purposes. In some such embodiments, a plurality of dead areas are grouped together into a designated area with a corresponding resolution. In some such embodiments, position within the dead area, e.g., which particular indexed grid block within the dead area the mobile device is located in, is estimated based on prior location, estimated speed and estimated direction, and received position information from other mobile devices in its vicinity.

Figure 6:
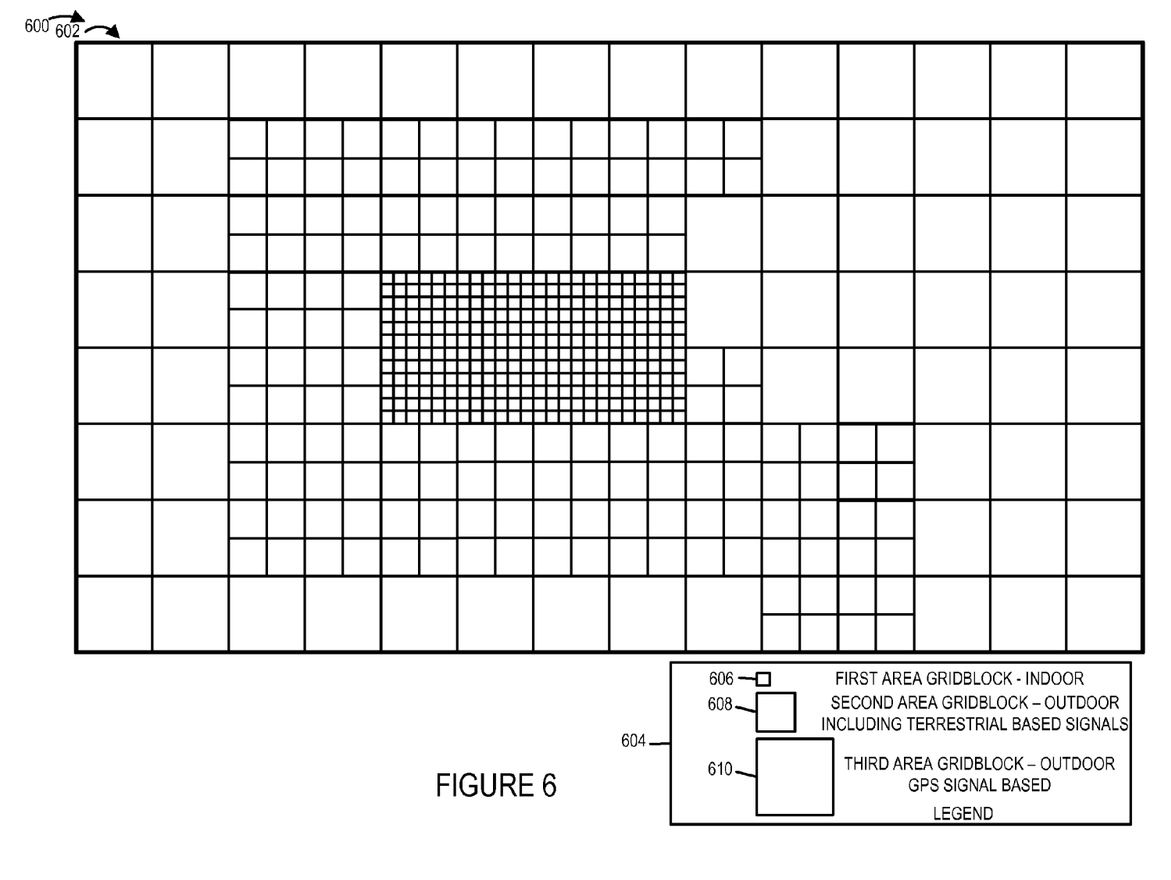
FIG. 6 is a drawing illustrating exemplary different grid resolutions corresponding to the different areas of the FIG. 5 example.

FIG. 6 is a drawing 600 illustrating exemplary different grid resolutions corresponding to the different areas of the FIG. 5 example. Drawing 602 is a gridmap corresponding to coverage area 500 of FIG. 5. Legend 604 indicates that the small size rectangular blocks such as gridblock 606 are gridblocks of first area 502 which is an indoor area. Legend 604 further indicates that the intermediate size rectangular blocks such as gridblock 608 are gridblocks of second area 504 which is an outdoor area using terrestrial based signals for position determination. Legend 604 further indicates that the large size rectangular blocks such as gridblock 610 are gridblocks of third area 506 which is an outdoor area using GPS based signals for position determination. In various embodiments, the gridblocks within each area are indexed and the indexing is known to the mobile wireless devices which are performing the position determination.

Various aspects and/or features of some embodiments will be further described. Some embodiments include methods and apparatus used for practical implementation of mobile device positioning including indoor positioning, e.g., for estimating a geolocation of a wireless communications device. Some embodiments include one or more of a class of practical and efficient positioning methods using a state-space approach. In this approach, the physical space where positioning takes place is fragmented into regions, each region being assigned to one or more states. A given state may also incorporate additional information such as direction, speed, etc. Hence a state describes the condition of a mobile wireless at a certain point in time. The density of the discrete grid formed by the set of states with respect to a given geographic region determines the accuracy of the positioning algorithm. The richer the state space is, the finer a position estimate may eventually be. However a trade-off has to be made between the richness of the state space and the implementation complexity, which is a function of computational complexity as well as storage requirement. The need for a smart trade-off is even more important when the positioning method is distributed over multiple mobile users through space and time. The collaboration between the various devices, in some embodiments, includes coordination and multiple communication rounds. In some embodiments, it is beneficial if the amount of exchanged information is tightly controlled and optimized in order for the system to jointly achieve a targeted positioning accuracy.

Some exemplary methods are directed to controlling the complexity level used in mobile device position determination. One goal of some embodiments is to determine how to collapse multiple states into one super-state and/or expand one super-state into its constituent states. This determination may be, and sometimes is, done based on external signals, previously determined position and/or the desired accuracy target. It can be, and in some embodiments is iteratively performed. In some embodiments, the list of states is stored and dynamically updated over time. Discrete-grid-based methods are performed on the dynamically evolving list of states. The reduced size of the list leads to a tractable algorithmic complexity. At each point in time, the stored list of states has a well-defined overall metric. Complementary metrics are further associated with the new subdivision of the space. The size of the list of states together with the space subdivision is a measure of the complexity. The evolution and of the control of the complexity is a dynamic process. It can also be an adaptive process triggered by external or internal signals e.g., targeted precision, available computational resources, number of cooperative devices, iteration index in a localization induction process.

In some embodiments, based a trigger signal, e.g., a GPS, Wi-Fi, or some other signal which may be used for position determination purposes, the wireless device determine the resolution, e.g., geographic grid resolution, to be used for location determination purposes. In various embodiments, the wireless device uses higher resolution for regions with shorter more accurate signals, e.g., the wireless device uses higher resolution for regions where Wi-Fi signals are available as compared to regions where GPS or base station signals are available. In various embodiments, different regions have different resolutions. In some embodiments, a wireless device may, and sometimes does, communicate map information for regions over a predetermined probability that the device is located in the region. In some embodiments, a wireless device may and sometimes does communicate information about a new region of interest.

Various exemplary positioning methods will further iterate over resolution layers and/or time indices. In a first example, consider that we are using a state space with 5000 states and a certain number of fixed wireless anchors, e.g., Wi-Fi access points or APs. Each state represents a geographical region of a plane. Assume that a mobile wireless device is describing a random walk and receives a Wi-Fi beacon from each AP every second. A maximum-likelihood position estimate at time t, given the past observations, can be obtained from a BCJR/Baum-Welch Markovian framework. The straightforward and quite complex implementation would use a trellis with 5000 states and dynamically compute the probabilities of those 5000 states. In some embodiments the complexity is reduced for a single user via collapsing of a complementary region. At time t, consider that a subset of AP beacons is detected above a certain power threshold. Suppose that this threshold indicates that the device is located within a well-defined perimeter: call this enclosed region $R\_t$ with $|R\_t| \ll 5000$. The storage requirement for each of the probabilities of $R\_t$ is typically only $|R\_t| \times n$ bits, assuming n bits encode each probability metric. The region's probability $Pr\{R\_t\}$ is the sum of the probabilities of its states. The remaining $|R\_t|-5000$ locals can be collapsed to one single superstate with probability equal to $1-Pr\{R\_t\}$. The BCJR forward recursion is only performed from $R\_t$ to the new region $R\_t+1$, hence reducing the computational complexity. Notice that, in practical (suboptimal) implementations, the non-infinite numerical precision (encoded on n bits) makes that many of those probability cannot be distinguished from 0. Hence, compared to the original state space with 5000 states, no information is lost if the probabilities of the complementary region are found to be below the numerical precision.

In some embodiments, a complexity reduction for multi-user positioning is achieved via an exchange of relevant information. Consider that a mobile A wishes to communicate its current position soft estimate to a mobile B in order for them to jointly perform positioning. Because of airlink capacity and numerical limitations, it is desirable that A communicates to B only the part of the information that is significantly useful for B to perform the joint positioning task. Consider $R\_t(A)$ to be a region as defined above associated with A or a subset of such a region which describes the most relevant states. Consider $R\_t(B)$ to be the respective same region associated with B. Assume A sends the description of $R\_t(A)$ to B together or not with the associated probabilities. Consider the following simple instance of joint positioning. If the hard observation of $R\_t(A)$ from B validates $R\_t(B)$, then B's position estimate gets a certificate of being correct: the example of hard processing is robust against numerical instability.

In a second example, accuracy is improved using state expansion. For example, consider that a device with positioning information coming from, e.g., GPS or Gallileo, is about to enter a building or a mall in which a rich positioning information will be further available via, e.g., ultra-sounds reflecting on walls, power-based positioning on multiple APs, wheeled-card, etc. Its current state and the subsequent states can be expanded in order for the positioning method to achieve better positioning accuracy.

In various embodiments a device, e.g., wireless communications 128 in system 100 of FIG. 1, and/or wireless communication device 300 of FIG. 3, includes a module corresponding to each of the individual steps and/or operations described with regard to any of the Figures in the present application and/or described in the detailed description of the present application. The modules may, and sometimes are, implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., network nodes, mobile nodes such as mobile terminals, access points such as base stations, and/or communications systems. Various embodiments are also directed to methods, e.g., method of controlling and/or operating network nodes, mobile nodes, access points such as base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. In at least some hardware embodiments the modules are implemented as electrical circuits. However, in other embodiments modules may include software. Many of the above described methods or method steps can, and in some embodiments are, implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as network nodes, access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., Wi-Fi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of controlling a wireless device that provides positioning related information, the method comprising:
   receiving a first signal used for making a position determination, said first signal being of a first signal type;
   determining, based on said first signal type, a first resolution to be used for a first area in which the wireless device may be located, wherein the first signal is a signal having a first coverage range, said first range corresponding to said first area;
   performing a first location determination operation based on the first determined resolution;
   receiving a second signal having a second coverage range, said second range being longer than said first range; and
   determining a second resolution for a second area falling in the coverage range of said second signal but being outside the coverage range of said first signal, the second resolution being lower than said first resolution,
   wherein a resolution determined based on a signal from an indoor signal source is higher than a resolution determined based on an outdoor signal source.

2. The method of claim 1, wherein said second signal is one of a GPS or cellular base station signal; and
   wherein said first signal is one of a Wi-Fi, Bluetooth, or audio signal.

3. The method of claim 1, wherein a resolution determined based on a terrestrial signal is higher than a resolution determined based on a satellite signal.

4. The method of claim 1, further comprising:
   dividing a geographic region which includes said first area into a plurality of areas based on said first signal; and
   determining a different resolution for at least two of said plurality of areas.

5. The method of claim 4, wherein said plurality of areas comprises an indoor area and an outdoor area.

6. The method of claim 1:
   wherein said first resolution comprises a resolution for a grid; and
   wherein said first signal type comprises a signal selected from a plurality of signal types.

7. A wireless device comprising:
   means for receiving a first signal used for making a position determination, said first signal being of a first signal type;
   means for determining, based on said first signal type, a first resolution to be used for a first area in which the wireless device may be located, wherein the first signal is a signal having a first coverage range, said first range corresponding to said first area;
   means for performing a first location determination operation based on the first determined resolution;
   means for receiving a second signal having a second coverage range, said second range being longer than said first range; and
   means for determining a second resolution for a second area falling in the coverage range of said second signal but being outside the coverage range of said first signal, the second resolution being lower than said first resolution,
   wherein a resolution determined based on a signal from an indoor signal source is higher than a resolution determined based on an outdoor signal source.

8. The wireless device of claim 7, wherein said second signal is one of a GPS or cellular base station signal; and
   wherein said first signal is one of a WI-FI, Bluetooth, or audio signal.

9. The wireless device of claim 7, wherein a resolution determined based on a terrestrial signal is higher than a resolution determined based on a satellite signal.

10. The wireless device of claim 7, further comprising:
    means for dividing a geographic region which includes said first area into a plurality of areas based on said first signal; and
    means for determining a different resolution for at least two of said plurality of areas.

11. The wireless device of claim 10, wherein said plurality of areas comprises an indoor area and an outdoor area.

12. The wireless device of claim 7:
    wherein said first resolution comprises a resolution for a grid; and
    wherein said first signal type comprises a signal selected from a plurality of signal types.

13. A computer program product for use in a wireless device, the computer program product comprising:
    a non-transitory computer readable medium comprising:
        code for causing at least one computer to receive a first signal used for making a position determination, said first signal being of a first signal type;
        code for causing said at least one computer to determine, based on said first signal type, a first resolution to be used for a first area in which the wireless device may be located, wherein the first signal is a signal having a first coverage range, said first range corresponding to said first area;
        code for causing said at least one computer to perform a first location determination operation based on the first determined resolution;
        code for causing said at least one computer to receive a second signal having a second coverage range, said second range being longer than said first range; and
        code for causing said at least one computer to determine a second resolution for a second area falling in the coverage range of said second signal but being outside the coverage range of said first signal, the second resolution being lower than said first resolution,
        wherein a resolution determined based on a signal from an indoor signal source is higher than a resolution determined based on an outdoor signal source.

14. The computer program product of claim 13, wherein said second signal is one of a GPS or cellular base station signal; and
    wherein said first signal is one of a Wi-Fi, Bluetooth, or audio signal.

15. The computer program product of claim 13, wherein a resolution determined based on a terrestrial signal is higher than a resolution determined based on a satellite signal.

16. The computer program product of claim 13, further comprising:
    code for causing said at least one computer to divide a geographic region which includes said first area into a plurality of areas based on said first signal; and
    code for causing said at least one computer to determine a different resolution for at least two of said plurality of areas.

17. The computer program product of claim 16, wherein said plurality of areas comprises an indoor area and an outdoor area.

18. The computer program product of claim 13:
    wherein said first resolution comprises a resolution for a grid; and
    wherein said first signal type comprises a signal selected from a plurality of signal types.

19. A wireless device comprising:
at least one processor configured to:
  receive a first signal used for making a position determination, said first signal being of a first signal type;
  determine, based on said first signal type, a first resolution to be used for a first area in which the wireless device may be located, wherein the first signal is a signal having a first coverage range, said first range corresponding to said first area;
  perform a first location determination operation based on the first determined resolution;
  receive a second signal having a second coverage range, said second range being longer than said first range; and
  determine a second resolution for a second area falling in the coverage range of said second signal but being outside the coverage range of said first signal, the second resolution being lower than said first resolution; and
memory coupled to said at least one processor,
wherein a resolution determined based on a signal from an indoor signal source is higher than a resolution determined based on an outdoor signal source.

20. The wireless device of claim 19, wherein said second signal is one of a GPS or cellular base station signal; and
  wherein said first signal is one of a Wi-Fi, Bluetooth or audio signal.

21. The wireless device of claim 19, wherein a resolution determined based on a terrestrial signal is higher than a resolution determined based on a satellite signal.

22. The wireless device of claim 19, wherein the at least one processor is configured to:
  divide a geographic region which includes said first area into a plurality of areas based on said first signal; and
  determine a different resolution for at least two of said plurality of areas.

23. The wireless device of claim 22, wherein said plurality of areas comprises an indoor area and an outdoor area.

24. The wireless device of claim 19:
  wherein said first resolution comprises a resolution for a grid; and
  wherein said first signal type comprises a signal selected from a plurality of signal types.

* * * * *